United States Patent [19]
Henson et al.

[11] 3,963,836
[45] June 15, 1976

[54] PREPARATION OF YOGURT AND QUARK

[75] Inventors: Alec Frank Henson, Twickenham, England; Gerard Marcel Marius Bret, The Hague, Netherlands

[73] Assignee: Lever Brothers Company, New York, N.Y.

[22] Filed: Jan. 3, 1975

[21] Appl. No.: 538,426

Related U.S. Application Data

[63] Continuation of Ser. No. 358,441, May 8, 1973, abandoned.

[30] Foreign Application Priority Data
May 10, 1972 United Kingdom............ 21793/72

[52] U.S. Cl................................. 426/40; 426/34; 426/36; 426/43; 426/491; 426/564
[51] Int. Cl.²................ A23C 19/02; A23C 23/00
[58] Field of Search............... 426/34, 36, 40, 43, 426/42, 491, 564

[56] References Cited
UNITED STATES PATENTS
3,128,190    4/1964    Donay et al. .................. 426/43

FOREIGN PATENTS OR APPLICATIONS
2,052,121    1971    France

OTHER PUBLICATIONS

Claydon et al., *Experiences with Quark on a Pilot Scale*, American Dairy Review, 2/1972, (pp. 32B–32C).
Hutch, J., *Cheese Making in the Year 2000*, La Technique Laitere, 1960, (pp. 33–36).
Webb, B. H., *The Production and Use of Concentrated Skim Milk Foam*, J. Da. Sci., vol. 24, 1941, (pp. 829–834).

*Primary Examiner*—David M. Naff
*Attorney, Agent, or Firm*—James J. Farrell; Kenneth F. Dusyn; Melvin H. Kurtz

[57] ABSTRACT

Yogurt and quark are prepared by a process wherein milk prior to culturing and coagulating is subjected to ultrafiltration to concentrate and to remove mineral salts with or without lactose removal. This process provides a high degree of flexibility in composition, and enhanced viscosity and increased yield. Additionally, quark made by the process is capable of being whipped to at least 200% overrun.

2 Claims, No Drawings

PREPARATION OF YOGURT AND QUARK

This is a continuation of application Ser. No. 358,441, filed May 8, 1973, now abandoned.

BACKGROUND OF THE INVENTION

1. Field of the Invention

The invention relates to the preparation of cultured milk products and particularly to such products as quark and yogurt. The invention particularly relates also to membrane filtration of milk and similar liquid milk products containing coagulable protein, as a preliminary to reduce its mineral salt content and if desired concentrate its protein content before the protein is coagulated by incubation, for example, with lactic acid starters.

Membrane filtration is a technique developed recently to provide a cheap desalination process for rendering brackish water potable. The principle upon which it is based is the reversibility under sufficient pressure of the liquid flow through semi-permeable membranes due to reverse osmosis, solvent being removed from the salt solution under pressure through the membrane which accepts the smaller solvent molecules but resists the passage through it in the reverse direction of the larger salt ions.

The application of the membrane filtration principle has more recently been extended to effect the concentration of solutions both of inorganic and organic solutes, and particularly in the Food Industry.

The pressure applied to effect membrane filtration must exceed the osmotic pressure of the solution. Where this is considerable, as in the case of solutions of salts and solutes of similarly small dimensions, the process is usually known as reverse osmosis, whereas the term ultrafiltration connotes the application of the principle to solutions of substantially bigger and usually organic molecules, for example proteins.

Membranes suitable for effecting membrane filtration are usually cast from solutions of film-forming polymeric material, particularly cellulose esters, but including synthetic polymers, e.g. vinyl esters, polyolefins and acrylics. The membrane is necessarily flimsy and careful design of supporting equipment for it is necessary to avoid rupture in use.

The invention is concerned with the application of membrane filtration to the preparation of cultured milk products, notably quark and cheese. These products are prepared by incubation of lactic acid starters in milk and similar liquid milk products containing coagulable protein.

2. The Prior Art

Many literature sources are available on the application of the general principles of reverse osmosis to the Food Industry, e.g. "Applications of Reverse Osmosis and electrodiolysis in food technology" (Claudio P., Ind. Ag. (Florence) 1968, 6 (3) 163–73); "Reverse Osmosis for food processing" (Meison et al., Western Regional Res. Lab.) (Dechema Monograph 1969, 63, 1125–43, 179–201); Lowe and Darker, *Food Technology* 23 (6) 753 (1969), and *J. Food Sci.* 36, (1) 31 (1971). The application of the technique to the manufacture of cheese is described in British Pat. No. 1,286,403. According to this specification cheese is made by first concentrating milk until a "liquid cheese" is obtained, having the same protein concentration as the cheese product. The cheese is then prepared from the concentrate by conventional cheese-making methods, the milk casein being coagulated with rennet, but without the customary discharge of soluble protein in the form of whey.

This invention relates to cultured milk products, particularly to products known as yogurt and quark.

Quark and yogurt are products obtained by culturing liquid milk or a liquid milk product such as skim milk or reconstituted powdered milk with lactis starters, i.e. lactic acid-producing bacteria. The souring culture is added, usually after a heat treatment to pasteurise the milk, and grown for a predetermined period to develop a pleasantly acid flavour and at the same time confer some degree of bacterial stability on the product.

Quark is a crude, skim milk cheese obtained by the coagulation of protein in the skim milk at its isoelectric point by the action of a bacterial culture, whey being expressed by syneresis in conventional methods of preparation. The curdy mass is packed and eaten without the further processing customary for other forms of cheese, in the preparation of which moreover a curdy mass is obtained by renneting.

In the manufacture of yogurt on the other hand, while some whey separation may occur it is mechanically re-combined with the more solid coagulated protein precipitated by the action of the culture starters, to form an essentially softer but still thick product. A culture mixture combining both Lactobacillus and Streptococcus strains is usually employed and the preliminary heat treatment of the milk may also be slightly different to provide particular product characteristics. In the preparation of other coagulated milk products coagulation may be effected principally by renneting or the addition of acids or enzymes. Fermented milk drinks, for example koumiss, remain substantially liquid and are prepared using yogurt cultures and a selected yeast.

The presence of the lactose sugar occurring naturally in milk is essential as a growth substrate for the starter cultures used in such preparations. While the amount of protein present may be varied, for example by preparing more or less concentrated liquid milk compositions reconstituted from powdered milk, this is normally possible only with the introduction at the same time of excessive quantities of mineral salts also present in milk with a consequent deterioration in flavour of the product.

The present invention provides a process permitting greater flexibility in the composition of cultured milk products in which, before coagulation, the milk is brought into contact with a semi-permeable membrane to reduce selectively at least the mineral salts content from the milk by membrane filtration.

Preferably the milk is skim milk and it may be obtained directly from milk or by reconstituting dried, preferably non-fat, milk powder. While the majority of the milk products to which the invention refers are prepared from cows' milk, other sources, for example mares' milk, asses' milk or milk from other domesticated mammals may be used in the invention.

The invention provides a high degree of flexibility in the composition of milk products. For example, in the conventional preparation of quark a substantial proportion, as much as 20% of proteinaceous material is discharged by syneresis from the curds, amounting to considerable loss in food value. If in accordance with the present invention an initial concentration of the liquid milk is effected prior to culturing, preferably reducing the volume of the milk and correspondingly its mineral salt content, to between 25 and 80%, and particularly between 25 and 35%, of the original amount, substantially less whey separation takes place when the concentrate is cultured in the conventional manner, the product nevertheless taking on the characteristic curdy appearance of conventional quark. Upon concentration to less than about half the original volume, particularly at concentrations at which the composition of the liquid milk corresponds to that of the desired quark, substantially no whey separation at all occurs.

In the manufacture of conventional quark it is usually necessary to realise a protein content of about 13% to 15% in order to achieve an acceptably thick and attractive product resistant to whey separation. By the process of the present invention products of enhanced viscosity are obtained, enabling greater quantities to be made from a unit quantity of milk, by producing products of acceptably high viscosity which have lower protein content than has hitherto been necessary, for example 10–13% protein or in the range of 4 to 15% protein. Preferably the protein content is 7–15 wt % and the viscosity, at least sufficient to provide a cone penetrometer reading, measured as described below, less than 95 mm$^{-1}$. This phenomenon of increased yield is not quantitatively attributable to the retention of whey protein in the product.

It will be understood that although it is preferred in the preparation of quark in accordance with the present invention to operate using conditions in which no whey is expressed, further conditions still fall within the scope of the invention in which some syneresis may occur with the exudation of a limited amount of whey.

Further flexibility is provided by the possibility of removing substantially all mineral salts, alone or with lactose in the preliminary membrane filtration. This may be effected by a concentration as previously described, followed by dilution with water and further concentration, repeated if necessary, until all or substantially all the non-protein solutes are removed. Fresh lactose may then be added, in precise amount if desired, to that affording a predetermined degree of acidity, preferably pH from 4.3 to 4.6, by culturing in the conventional manner, thus providing a product which, being substantially free from residual sugar, may for special purposes be dietetically desirable, and of greater microbiological stability, since the biological action of the culture cannot continue, in contrast with conventional products which, since they contain residual sugar, may reach undesirably high acidity levels during storage. Alternatively, a semi-permeable membrane may be selected which has a low rejection characteristic for mineral salts only, with the effect that the lactose or a substantial part thereof is retained in the concentrated milk, providing a product which is sweetened in situ. Obviously care is needed with such products to avoid over-culturing, for example by pasteurisation after culturing.

While the rejection characteristic of the semi-permeable membrane used in the process of the invention may be varied according to the particular function which the membrane is required to perform, the membrane should in any event retain substantially all the protein matter in the milk. Accordingly, the rejection characteristic R should be at least 0.8, and preferably 0.98 or more for whey proteins. This factor is defined as $$1 - \frac{\text{concentration in permeate}}{\text{concentration in feed solution.}}$$

For a solute totally unable to penetrate the membrane $R = 1$, and for one which penetrates as easily as water, $R = 0$; during the process the concentration of such solute does not increase. Should an unsweetened liquid product be required, then the value of R for lactose should be not more than 0.15 to allow most of the lactose to pass into the permeate. For sweetened products R may be as high as 0.50 or even more.

The rejection characteristic R of the membrane for mineral salts should be as low as possible, consistent with other requirements, for the purpose of removing such salts from the product since they tend to confer unacceptable taste.

As in conventional practice, the milk should be pasteurised, preferably before the milk is subjected to membrane filtration. Where inoculation with starter cultures is effected, this should follow immediately afterwards. Pasteurisation may be carried out for example over a comparatively long period of about 30 minutes at temperatures between 55° and 65°C, or over a substantially shorter period; for example half a minute or even less, at high temperatures between for example 70° and 80°C, particularly about 75°C; these are particularly suitable for quark preparation, but the same ranges may be used at the corresponding temperatures for yogurt.

Following pasteurisation the milk is cooled as quickly as possible prior to subsequent treatment.

The degree of concentration required may be obtained by repeatedly exposing the milk to the semipermeable membrane, with recycling of the milk.

The membrane filtration may be carried out at refrigeration temperatures, for example at about 5°C or less, with the object of minimising proliferation of microorganisms in the milk. Higher temperatures may also be adopted which have the advantage of providing greater throughput, the upper limit being imposed by the physical characteristics of the membrane, and it may be possible to operate at sufficiently high temperatures to enable pasteurisation and concentration to be carried out at the same time. Preferably however the temperature does not exceed 50°C.

A variety of semi-permeable membranes, with their ancillary equipment, available commercially is suitable for use in the process of the invention. The material from which the membrane is prepared may vary widely. Commonly, however, membranes made from cellulose acetate or synthetic resin, e.g. polyvinyl chloride, polyacrylonitrile, polyolefines or polyacrylic esters, and reaction products of organic polyanions and polycations, may be suitable. The membrane may be adapted in a variety of shapes for use, as flat film, tube for example, suitably backed for mechanical rigidity by a porous former. Usually the membranes are cast from solution in organic solvents such as acetone.

A back-pressure on the liquid milk in contact with the membrane of between 1 and 50 Kgs/cm$^2$ across the membrane is usually sufficient to provide an adequate flow therethrough.

The process according to the invention may be carried out in a continuous fashion, milk being continuously concentrated and the concentrate converted in successively drawn batches into coagulated milk products.

After membrane filtration, the liquid milk product is coagulated usually by inoculation with a culture, according to the product required. A suitable amount of culture is within the range 0.1 to 5%, and a particularly suitable range is between 0.5 and 2% by weight. A substantially smaller quantity of rennet, if any, is employed, as little as 0.01 wt %, or even less being adequate for quark production.

The inoculation step is usually carried out at a temperature best suited for the microorganism in use, for example between 20° and 35°C, preferably between 25° and 30°C in the preparation of quark and 40° to 50°C for yogurt.

The setting time for the curd to form varies according to the concentration of protein, the temperature and the concentration of inoculum present, but is usually between 12 and 24 hours for quark and less for yogurt. During this period the curd is best left undisturbed until total acidity is about 0.8–0.9% (as lactic acid), corresponding to about pH 4.5 in the case of quark. Higher acidity adversely affects the quality of the product. After coagulation is substantially complete, shown by pH determination, further culturing is suppressed by lowering the temperature and the coagulum may be sheared by stirring until it is of a fine creamy consistency after removing any whey that separates. Shearing or smoothing in this way is desirable to avoid a lumpy or granular product.

While it is preferred to effect concentration to an extent which eliminates entirely the necessity for separating whey, the invention will be understood to include a limited whey removal where a lower degree of concentration may be desirable, for example for the purposes of increasing throughput.

The completed product may be admixed with other edible additives, e.g. cream and whole or comminuted fruit. It may also be aerated and for this purpose whipping additives may be included.

As produced by the process of the invention, quark has excellent aerating and whipping properties, compared with conventional quark which is normally capable only of about 10% to 20% over-run and produces an unstable foam. For higher over-run values whipping and stabilising agents must be added to conventional quark, a practice which would contravene food regulations in some countries. By contrast, the quark products of the present invention are usually capable of at least 200% over-run, unaided, and give a much more stable foam, even with little if any fat present.

The present invention also provides an improved process for the preparation of yogurt. By carrying out the membrane filtration preliminary treatment step in a manner which provides a decreased mineral salt content in the treated, concentrated liquid milk product of the preliminary step, a yogurt is obtained having an improved viscosity/protein ratio, with the effect that, as with the production of quark according to the invention, an improved yield results.

EXAMPLE

Fresh milk having a protein content 3.3%, a lactose content 4.8% and fat content 3.7% was pasteurised at 72°C for 15 seconds in a commercial multiplate pasteuriser heated with hot water.

Cream was separated by a centrifugal separator, producing skim milk with a fat content less than 0.1% and substantially unchanged protein and lactose content.

The skim milk may at this stage be enriched by the addition with homogenisation of up to half the original fat content.

After cooling quickly to 50°F, 6 gallons of the skim milk was circulated at a rate of 100 gals./hour in a membrane filtration apparatus in which it was maintained in contact for 3 hours with the semi-permeable membrane at a back-pressure across the membrane of 50–160 lbs. gauge per sq. inch, the milk being concentrated to ⅓ of its original volume.

The membrane in the apparatus was supplied and identified as PM 10 by Amicon Corpn. It comprised a series of 15 substantially flat sheets of a polyionic copolymer supported on parallel plates furnished with spiral grooves providing conduits through which the milk was pumped in contact with the sheets, these providing a contact area of 2 ft$^2$. The rejection characteristic R of the membrane was less than 0.05 with respect to mineral salts, 0.15 for lactose and 1.0 for whey protein.

The composition of the concentrated milk was 10% protein, 1½% mineral salts and, using skim milk feed, less than 1% fat. The lactose concentration remained unchanged. It was pasteurised at 65°C for 30 mins., cooled to 23°C and cultured in a single batch with 1% S. Cremoris, added in quark.

After 16 hours a pH of 4.6 was recorded and further acidification discontinued by cooling to refrigerator temperature and leaving a pumpable mass of quark finally packed for consumption.

The quark product was obtained in better than 30% yield. It contained 10% protein, 3% lactose, and 1.5% mineral salts.

A measure of the viscosity of the product was obtained by cone penetrometer determination. At 10°C, a metal cone with a 40° angle, penetrating the material from rest on the surface for 5 secs. with a weight of 17.1 gms., giving an indicated reading of 52–56 mm$^{-1}$.

By comparison, the yield of quark obtained by conventional means was only 25%, with a protein content of 13–14% and a cone penetrometer reading under similar conditions of 89 mm$^{-1}$.

After adding 5% sugar for flavour purposes, the product quark was whipped to 100% over-run stable foam, using a domestic Kenwood blender. A similar, 50% over-run product discharged no whey after 14 days at 10°C.

In a series of comparative experiments the protein content/viscosity relationship was explored, both for commercially obtained samples of quark and for others prepared in accordance with the Example, over a wide shear range, using a Haake Viscometer at a temperature of 10°C.

Both at shear rate values at which viscosity differences can be perceived visually and those at which they can be perceived on tasting by oral response, a consistent improvement in the viscosity/protein relationship was observed throughout the measurements, in favour of the products according to the invention, which show a substantially higher viscosity at given protein concentrations and establish that, whatever viscosity is required within the range conventionally provided by quark products, it may be met by products according to the invention having a substantially lower protein content than has hitherto been necessary.

In the accompanying Table the results obtained at a shear rate of 16.3 sec.$^{-1}$ are shown. This rate corresponds to the region within which "mouth-feel" is apparent. The results confirm the above observations.

TABLE

| Quark source Commercial | Protein (wt %) | Viscosity (poises) |
|---|---|---|
| A | 8.0 | 49 |
| B | 11.9 | 120 |
| C | 12.32 | 130 |
| Example | | |
| 1 | 7.25 | 74 |
| 2 | 12.25 | 184 |

What is claimed is:

1. Process for the preparation of whipped quark having at least 200% unaided overrun comprising the steps of
   a. pasteurizing milk at a temperature of from about 55 to 80°C for about one half of 1 minute to about 30 minutes,
   b. cooling the pasteurized milk to a temperature of about 5°C to 50°C,
   c. filtering the cooled pasteurized milk through a semi-permeable membrane which is permeable with respect to mineral salts and has a rejection characteristic of at least 0.8 with respect to milk proteins at a pressure of from 1 to 50 kg/cm$^2$ to obtain a protein-rich residue separated from a mineral salt-rich filtrate,
   d. discontinuing the filtration when the volume of the residue is from 25 to 80 volume percent of the original volume of the milk, said residue containing from about 4% to about 15% protein,
   e. adjusting the temperature of the residue to 20° to 35°C,
   f. inoculating the residue with 0.1 to 5 weight percent of a quark culture lactic acid starter,
   g. incubating the inoculated residue for a period from 12 to 24 hours to a pH of about 4.5 to coagulate milk proteins,
   h. discontinuing further inoculation when coagulation is substantially complete and removing any whey separated, and
   i. whipping the coagulum obtained to an overrun of at least 200%.

2. Whipped quark made by the process of claim 1.

* * * * *